United States Patent
Gonzalez et al.

(10) Patent No.: US 11,181,444 B2
(45) Date of Patent: Nov. 23, 2021

(54) METHOD FOR THE DETECTION OF A GLOW PLUG REPLACEMENT

(71) Applicant: BorgWarner Ludwigsburg GmbH, Ludwigsburg (DE)

(72) Inventors: Karen Gonzalez, Filderstadt (DE); Karsten Volland, Ludwigsburg (DE); Jörg Stöckle, Ludwigsburg (DE); Andreas Klingebiel, Marbach am Neckar (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 100 days.

(21) Appl. No.: 16/807,620

(22) Filed: Mar. 3, 2020

(65) Prior Publication Data
US 2020/0284691 A1 Sep. 10, 2020

(30) Foreign Application Priority Data
Mar. 6, 2019 (DE) .................... 10 2019 105 618.7

(51) Int. Cl.
*G01M 15/04* (2006.01)
*F02P 17/00* (2006.01)
*F02P 19/02* (2006.01)

(52) U.S. Cl.
CPC .......... *G01M 15/042* (2013.01); *F02P 17/00* (2013.01); *F02P 19/027* (2013.01)

(58) Field of Classification Search
None
See application file for complete search history.

(56) References Cited

U.S. PATENT DOCUMENTS

| | | | |
|---|---|---|---|
| 7,886,587 B2 | 2/2011 | Moritz et al. | |
| 8,423,197 B2 * | 4/2013 | Sakurai | F02P 19/025 |
| | | | 700/296 |
| 8,552,751 B2 * | 10/2013 | Kernwein | F02P 19/022 |
| | | | 324/693 |
| 8,826,729 B2 | 9/2014 | Moritz et al. | |

(Continued)

FOREIGN PATENT DOCUMENTS

| | | |
|---|---|---|
| DE | 10 2008 007 398 A1 | 8/2009 |
| DE | 10 2010 040 682 A1 | 3/2012 |
| DE | 10 2011 086 445 A1 | 5/2013 |

*Primary Examiner* — Freddie Kirkland, III
(74) *Attorney, Agent, or Firm* — Bose McKinney & Evans LLP

(57) ABSTRACT

A method for detecting glow plug replacement or an aging glow plug. The glow plugs are heated and monitored. When a threshold value is reached for a first glow plug, a first value of a temperature-dependent variable is measured for all other glow plugs and is stored as reference values associated with the first glow plug. This process is repeated until reference values associated with each glow plug have been determined and stored for each glow plug. The process is repeated to determine a set of comparative values. The comparative values are compared with the reference values. A deviation of a comparative from a reference value of less than a specified tolerance value is considered an agreement. The inventive process concludes which of the glow plugs of the engine are unaltered and which have a resistance-temperature characteristic that has been altered to an extent indicating replacement, aging or a defect.

9 Claims, 1 Drawing Sheet

(56) References Cited

U.S. PATENT DOCUMENTS

| | | | |
|---|---|---|---|
| 9,453,491 B2 * | 9/2016 | Tanaka | F02P 19/027 |
| 9,567,968 B2 | 2/2017 | Bleil et al. | |
| 9,822,755 B2 * | 11/2017 | Toyoshima | F02P 19/027 |
| 2009/0193882 A1 | 8/2009 | Moritz et al. | |
| 2013/0228007 A1 | 9/2013 | Moritz et al. | |

* cited by examiner

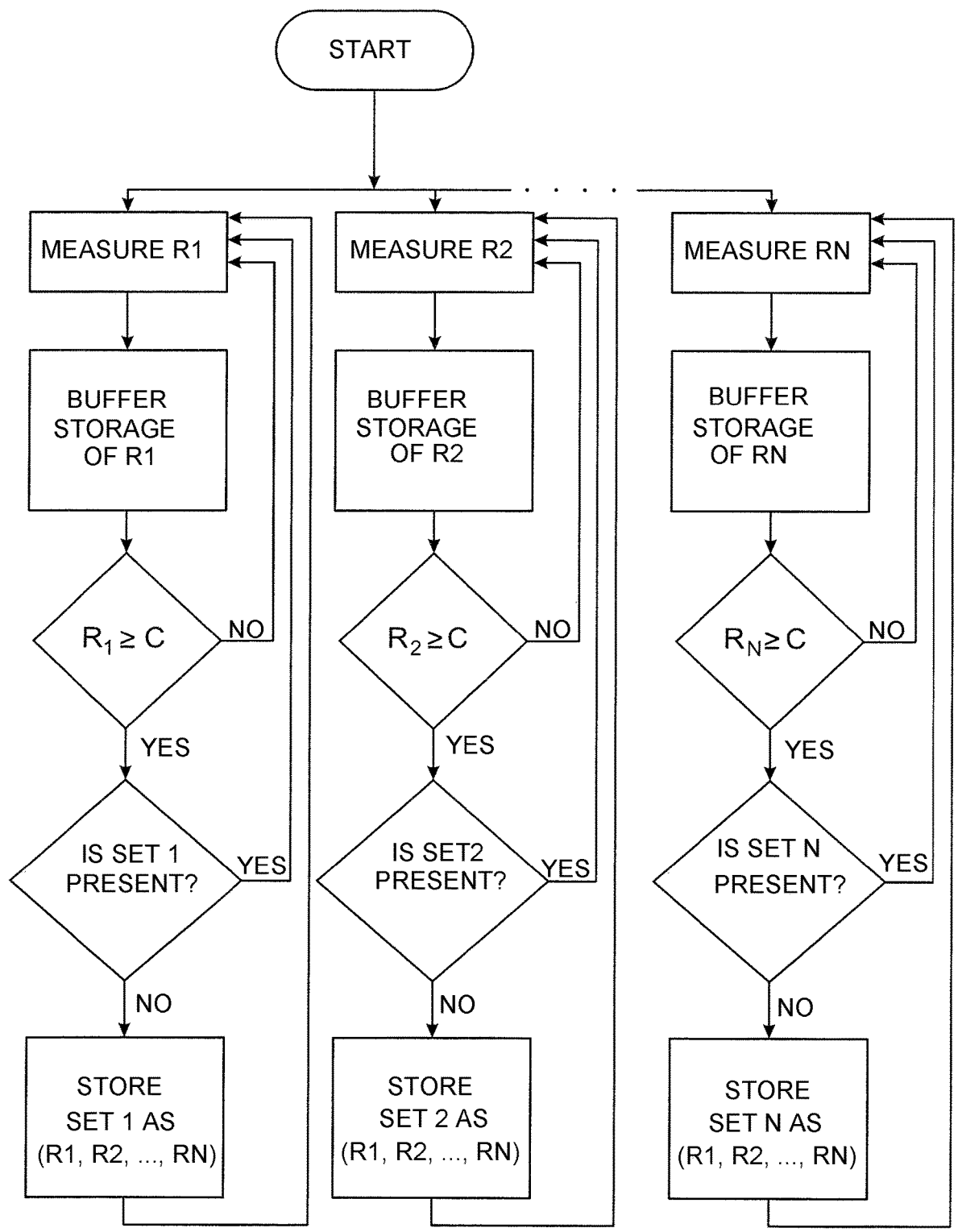

METHOD FOR THE DETECTION OF A GLOW PLUG REPLACEMENT

RELATED APPLICATIONS

This application claims priority to DE 10 2019 105 618.7, filed Mar. 6, 2019, the entire disclosure of which is hereby incorporated herein by reference.

BACKGROUND

This disclosure refers to a method for the detection of a replacement of ceramic glow plugs of an engine, or for the detection of an aged ceramic glow plug.

Automatic detection of a glow plug replacement is important because modern glow plug controllers control the temperature of a glow plug with a set of control parameters specific to the plug. If the glow plug-specific control parameters continue to be used unchanged after the glow plug has been replaced, there is a risk that the glow plug will be operated at temperatures that are too low, resulting in sub-optimal fuel combustion and poor to impossible starting characteristics, or at temperatures that are too high, resulting in damage to the glow plug due to severe aging and overheating and premature failure. Incorrectly operated plugs can lead to severe damage to the engine under extreme overload.

If a glow plug replacement is detected, this can be used to remind the user to enter new control parameters, or the glow plug controller can automatically determine new control parameters by heating the glow plug under controlled conditions. Such a determination is relatively time-consuming. Typically, a glow plug is operated with a defined heating capacity profile after a waiting time of up to one minute and the new control parameters are determined and stored. It is therefore not practicable to re-determine or extensively check the control parameters each time the vehicle is started.

U.S. Publication No. 2013/0228007 A1 discloses a method for detecting the replacement of glow plugs, wherein during a driving cycle under defined conditions, for example, with the application of a defined electrical voltage, an electrical parameter is determined for each glow plug, such as the current then flowing, or the electrical resistance. The relationship between these parameters is then regarded as a characteristic pattern for this set of glow plugs. For example, if the glow plug of the fourth cylinder has the lowest resistance, the glow plug of the second cylinder has the next lowest resistance, and the glow plugs of the first and third cylinders have the highest resistance, it is anticipated that this pattern will also be observed in subsequent driving cycles. If this is not the case, because, for example, the glow plug of the fourth cylinder no longer has the lowest resistance, but the glow plug of the second cylinder now has the lowest resistance, a conclusion is drawn that a glow plug has been replaced.

However, there is a significant probability that the same pattern will occur by chance when a glow plug is replaced, and that a glow plug replacement is therefore not detected.

In order to detect a glow plug replacement more reliably, it has been proposed in U.S. Pat. No. 9,567,968 B2 to heat all glow plugs with a uniformly specified power, and to measure the electrical resistance or another temperature-dependent electrical variable on all the glow plugs as soon as the glow plug of the first engine cylinder has reached a specified threshold value, and to store these values as reference values. If the glow plug of the first cylinder reaches this threshold value again in the course of a later heating procedure, all the other glow plugs of the engine should have again reached the reference values stored for them. If this is not the case, a conclusion is drawn that a glow plug has been replaced.

A disadvantage of both methods is that a defect in a single glow plug can be mistakenly interpreted as the replacement of all the glow plugs. Previous systems can therefore only detect that one plug is out of line, and assume that all plugs are faulty and trigger a re-characterization of all the plugs, even though only one plug is affected.

SUMMARY

This disclosure teaches a way of reliably detecting a glow plug replacement or aging on an individual plug-by-plug basis. In particular, the glow plug or glow plugs of an engine should be reliably identified for which, due to replacement, aging or defect, a stored resistance-temperature characteristic is unusable, and therefore the resistance-temperature characteristic must be re-determined for purposes of temperature regulation.

This disclosure assumes that, as a rule, all the glow plugs have the same temperature at the start of a heating procedure for starting an engine. How high this temperature is depends on the ambient temperature of the vehicle and also on the extent to which the glow plugs have cooled down since a previous operation of the engine. If all the glow plugs of an engine are then heated for a specified period of time by supplying a uniformly specified power, it can be assumed that all glow plugs of the engine always have the same temperature, even during the heating process, in particular they have the same surface temperature at their glow tips.

If a temperature-dependent variable of the glow plug of the first cylinder, such as its electrical resistance, reaches a specified threshold value during heating, e.g., 400 m$\Omega$, the other glow plugs of the engine may have slightly different values due to manufacturing tolerances, e.g., 380 m$\Omega$ or 410 m$\Omega$, even if all glow plugs of the engine have the same temperature, in particular the same surface temperature at their glow tips. If no glow plug has been replaced, it is anticipated that all glow plugs will behave in an unaltered manner when the glow plugs are reheated. Therefore, as soon as the glow plug of the first cylinder reaches this threshold value again when the glow plugs are reheated, it is to be anticipated that the other glow plugs will then also reach the same values that deviate slightly from this threshold value. In this case it can be assumed that the glow plugs have not been replaced, that no severe aging has taken place, and that none of the glow plugs is defective.

When the glow plug of the first cylinder reaches the specified threshold value, simultaneously measured values of the other glow plugs are stored as a reference value set, i.e., a set of reference values. If the glow plug of the first cylinder reaches this threshold value when it is reheated, simultaneously measured values of the other glow plugs are determined as a comparative value set, i.e., as a set of comparative values. In order to determine whether a glow plug replacement has taken place, the set of comparative values is then compared with the set of reference values by comparing the comparative value of the glow plug of one cylinder with the reference value of the glow plug of the cylinder in question.

Thus, in the case of a four-cylinder engine, the comparative value of the glow plug of the second cylinder is compared with the reference value of the glow plug of the second cylinder, the comparative value of the glow plug of the third cylinder is compared with the reference value of the glow plug of the third cylinder, and the comparative value of the glow plug of the fourth cylinder is compared with the reference value of the glow plug of the fourth cylinder. In general terms, the comparative value of the glow plug of the $n^{th}$ cylinder is compared with the reference value of the $n^{th}$ cylinder, wherein all integers from 2 to the number of cylinders of the engine are to be used consecutively for n.

In this comparison between a comparative value and a reference value, a deviation of the comparative value from the reference value by less than a specified tolerance value is considered to be an agreement. The tolerance value can be selected according to the measurement inaccuracy, that is to say, according to an anticipated measurement error. Thus, if the comparison shows complete agreement for the sets of reference and comparative values determined for the glow plug of the first cylinder, one can assume that no glow plug replacement or severe aging has taken place, and that all resistance-temperature characteristics are still valid. If any one of these comparisons does not show an agreement, such as between the comparative value for the glow plug of the second cylinder and the reference value for the glow plug of the second cylinder, this is an indication that the glow plug in question has been replaced.

If the sets of reference values and comparative values determined for the glow plug of the first cylinder do not agree at all, the possibility exists that all the glow plugs have been replaced. However, there is also the possibility that only the first glow plug is defective, has been replaced or, due to aging, has reached the threshold value at a different point in time than during characterization, and thus also at a different temperature, and therefore different values are measured for all the other glow plugs as soon as the temperature-dependent variable of the glow plug of the first cylinder reaches the threshold value. If the glow plug of the first cylinder, for which, when it reached the threshold value, reference and comparative values were measured on the other glow plugs, is referred to as a "lead plug," the reference to the "lead plug" can no longer be associated with what is in the stored table. Accordingly, all the other glow plugs are classified as unknown, although only the glow plug of the first cylinder no longer matches the others.

In order to be able to distinguish between these cases, in accordance with this disclosure a set of reference values with reference to the plug in cylinder 1 is therefore generated not only when the temperature-dependent variable of the glow plug of the first cylinder reaches the threshold value, but additionally also when every other glow plug of the engine reaches the previously defined threshold values and generates them in further reference data sets with reference to the "lead plug" in question.

In the case of a four-cylinder engine, therefore, when the temperature-dependent variable of the glow plug of the first cylinder reaches the threshold value, the temperature-dependent variable is also measured on the other glow plugs at the same time, and these values are stored as a first set of reference values. When the temperature-dependent variable of the glow plug of the second cylinder reaches the threshold value, the temperature-dependent variable is also measured on the other glow plugs at the same time, and these values are stored as the second set of reference values. When the temperature-dependent variable of the glow plug of the third cylinder reaches the threshold value, the temperature-dependent variable is also measured on the other glow plugs at the same time, and these values are stored as the third set of reference values. When the temperature-dependent variable of the glow plug of the fourth cylinder reaches the threshold value, the temperature-dependent variable is also measured on the other glow plugs at the same time, and these values are stored as the fourth set of reference values. In general terms, this process is repeated until each of the plugs has once functioned as a lead plug.

In general terms, at least two sets of reference values are generated, preferably as many sets as the engine has glow plugs. Each of the sets contains the same number of reference values, but always with reference to a different lead plug.

Accordingly, in the course of a subsequent heating procedure, as many sets of reference values are generated as the engine has glow plugs.

These sets are each designated in terms of the glow plug for which, upon reaching the threshold value, the point in time was determined for the measurements to be carried out on the other glow plugs so as to generate the reference and comparative values of the set. For example, the set of reference values or the set of comparative values that is generated when the temperature-dependent variable of the glow plug of the third cylinder reaches the threshold value is referred to as the set of reference values or the set of comparative values of the third glow plug, or as the third set of reference values or the third set of comparative values.

For example, if the glow plug of the first cylinder was replaced after the characterization, or has altered severely, and in terms of the temperature-dependent variable is severely different from the original glow plug.

In order to detect a glow plug replacement or an alteration in the plug, in accordance with this disclosure the set of comparative values associated with each glow plug is compared with the set of reference values associated with the latter. In the case of a four-cylinder engine, the set of comparative values of the first glow plug is compared with the set of reference values of the first glow plug, the set of comparative values of the second glow plug is compared with the set of reference values of the second glow plug, the set of comparative values of the third glow plug is compared with the set of reference values of the third glow plug, and the set of comparative values of the fourth glow plug is compared with the set of reference values of the fourth glow plug.

By evaluating the agreements of comparative values with reference values established in these comparisons, it is then determined as to whether a glow plug replacement has taken place, and which glow plugs have such a severely altered resistance-temperature characteristic as a result of replacement, aging or defect that a resistance-temperature characteristic stored for the engine cylinder in question has become unusable.

If no glow plug replacement has taken place, it is to be anticipated that all comparisons will result in agreements.

If only one of the glow plugs has been replaced (or is defective), it is to be anticipated that there is no agreement for this lead plug when comparing the relevant set of comparative values with the associated set of reference values for all the other glow plugs. If, for example, only the second glow plug has been replaced, a comparison of the second set of comparative values with the second set of reference values (apart from rare coincidences) does not result in an agreement for either the first glow plug, or for the third and other glow plugs. Moreover, in this case it is to be anticipated that a comparison of the first set of comparative values with the first set of reference values will not result in an agreement only for the second glow plug. Similarly, for a comparison of the third and every other set of comparative values with the corresponding set of reference values, it is to be anticipated that no agreement will ensue for only the second glow plug.

Therefore, if the $n^{th}$ glow plug has been replaced or is defective, it is accordingly to be anticipated that a comparison of the $n^{th}$ set of comparative values with the $n^{th}$ set of reference values will not result in any agreement for all the other glow plugs. In addition, it is to be anticipated that when comparing any other set of comparative values with the associated set of reference values, there will be no agreement with respect to the $n^{th}$ glow plug. Here n is a whole number, which can assume any value from 1 up to the number of glow plugs in the engine.

As a rule, temperature-dependent electrical variables such as electrical resistance cannot be measured continuously, but only at time intervals that are short to a greater or lesser extent, as conditioned, for example, by the clock frequency of a processor controlling the measurement. Therefore, it is often not possible to carry out a measurement on all the glow plugs immediately as soon as the temperature-dependent variable of one glow plug reaches the specified threshold value, but only with a noticeable delay. This usually results in the threshold value already being clearly exceeded to a greater or lesser extent when a measurement is carried out. If, for example, the electrical resistance of the glow plug is used as the temperature-dependent electrical variable and a threshold value of 400 mΩ is specified, the exceedance of the threshold value, for example, is usually not detected until the electrical resistance is already between 401 mΩ and 415 mΩ. From this it can be assumed that the measured values on the other glow plugs are also too high by 1 mΩ to 15 mΩ. The accuracy can therefore be improved by an appropriate correction. The sets of reference values and the sets of comparative values are therefore preferably corrected linearly by an amount by which the measured value on the $i^{th}$ glow plug deviates from the threshold value for the $i^{th}$ set of reference values or the $i^{th}$ set of comparative values, respectively, where i is an integer whose value runs from 1 up to the number of glow plugs of the engine.

If, for example, a threshold value of 400 mΩ is specified and an exceedance of the threshold value for the second glow plug is established for the first time at 413 mΩ, the following values of the resistances measured on the first to the fourth glow plugs can be available as a set of reference values for the second glow plug: 383 mΩ, 413 mΩ, 406 mΩ, 420 mΩ, Since the resistance measured for the second glow plug exceeds the threshold value of 400 mΩ by 13 mΩ, all values of the set can be corrected linearly by this amount. As a result of corresponding subtraction the following values ensue for a corrected set of reference values for the second glow plug: 370 mΩ, 400 mΩ, 393 mΩ, 407 mΩ.

If, for example, when determining the set of comparative values, an exceedance of the threshold value for the second glow plug is established for the first time at 405 mΩ, the following values of the resistances measured at the first to fourth glow plugs can be present as a set of comparative values for the second glow plug: 374 mΩ, 405 mΩ, 397 mΩ, 411 mΩ. A correction by the 5 mΩ, by which the measured value of the second glow plug exceeds the threshold value, then leads to the corrected set of comparative values: 369 mΩ, 400 mΩ, 392 mΩ, 406 mΩ.

Due to measurement errors or slight aging, even if the correction as described above is applied, isolated inconsistencies can occur when comparing a set of comparative values with the corresponding set of reference values of a glow plug, even though there should be an agreement per se. In these cases an increased level of reliability can be achieved by a statistical evaluation. If, for example, in the case of just a single comparison, such as a comparison of the first set of comparative values (i.e., with reference to the glow plug of the first cylinder as the lead plug) with the first set of reference values (i.e., with reference to the glow plug of the first cylinder as the lead plug), no agreement was established for the glow plug of the third cylinder, but agreement was established in a comparison of the sets of comparative values of the other glow plugs (i.e., with reference to glow plugs other than lead plugs) with the corresponding reference data sets, it can be assumed that the glow plug of the third cylinder has not been replaced, but that there was just an inaccuracy in the measurement, and that the resistance-temperature characteristic for the glow plug of the third cylinder is still valid.

In order to increase the reliability further, the method can also be carried out with a second threshold value, for which, when reached, a set of reference values and a set of comparative values is similarly generated for each glow plug. In the evaluation, sets of reference and comparative values for the first threshold value are to be considered separately from the sets of reference and comparative values for the second threshold value. However, the larger number of comparisons results in a larger number of agreements, or lack of agreements, and thus a larger database for a statistical evaluation is available in cases of doubt, and the influence of agreements by chance is also smaller.

Since the temperatures of the glow plugs change continuously during heating, it is important that the temperature-dependent variable is measured simultaneously on all the glow plugs of the engine. Since perfect simultaneity cannot be achieved in practice, the word 'simultaneously' in the context of this disclosure is to be understood to mean that the time that passes between the measurements on the various glow plugs of the engine is so short that no relevant temperature changes occur during this time.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 1 shows a flow chart, which illustrates how the sets of reference and comparative value are determined.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

FIG. 1 illustrates an example of embodiment of a method with which a set of reference values is determined for each of the glow plugs of an engine. The engine has N glow plugs, where N is an integer greater than 2.

The method illustrated in FIG. 1 is carried out while all the glow plugs of the engine are heated in the same way, that is to say, that each glow plug is supplied at a uniformly specified power. The uniformly specified power is supplied to the glow plugs for a specified period of time, which can be 2 seconds, for example. The method ends with the expiry of the specified period of time.

In the embodiment shown, the electrical resistance R is used as the temperature-dependent variable of the glow plugs. However, any other temperature-dependent electrical variable can be used instead.

While the glow plugs are heating up, the electrical resistance of each individual glow plug is continuously measured. The measurements are carried out simultaneously on all the glow plugs of the engine, or at least at such short intervals from one another that the temperature of the glow plugs changes only insignificantly during this time. The measurements can, for example, be carried out in successive cycles of a microprocessor. The results of these measurements are in each case stored in a buffer memory, for example as a set of measured values $(R_1, R_2, \ldots, R_N)$, and can be overwritten with the results from a later measurement.

For each of the measured resistances a check is then made as to whether it has reached a given threshold value C, i.e., a check is made as to whether $R_i$ is $\geq C$, wherein all integers from 1 to N are to be used for i in sequence.

If this condition is met for one of the glow plugs, e.g., the second glow plug, a check is made as to whether a set of reference values has already been stored for the glow plug in question. If this is not the case, the measured values $R_1$, $R_2, \ldots, R_N$ stored in the buffer memory are stored as a set of reference values for the glow plug in question. If the threshold value for one of the glow plugs has not yet been reached, or a set of reference values for the glow plug in question already exists, monitoring of the resistance of this glow plug nevertheless continues, since measured values of the resistance of this glow plug may still be required for sets of reference values of the other glow plugs.

As a rule, a set of reference values is generated and stored for each of the glow plugs using the method as described. Only if a glow plug is defective can the case occur in which the threshold value C for the glow plug in question is not reached within the specified heating time. In this case, the defective glow plug must be replaced and execution of the method repeated so that a set of reference values is available for each glow plug.

If there is a set of reference values for each glow plug, that is to say, if each glow plug has functioned as a lead plug, a set of comparative values is generated for each glow plug of the engine in order to detect a glow plug replacement during subsequent heating by an application of the method illustrated in FIG. 1.

If a set of reference values and a set of comparative values are available for each glow plug, for each glow plug i, the set of comparative values $V_i$ belonging to the latter is compared with the set of reference values $S_i$ belonging to the latter. For i, any whole number from 1 to N must be used, where N is the number of glow plugs in the engine.

A set of comparative values $V_i$ $(R_1, R_2, \ldots, R_N)$ is compared with a set of reference values $S_i$ $(R_1, R_2, \ldots, R_N)$ by comparing each of the resistance values $R_j$ of the set of comparative values with the corresponding resistance value $R_j$ of the set of reference values, where j is an integer less than N. The value $R_1$ of the set of comparative values $V_i$ measured on the first glow plug is compared with the value $R_1$ of the set of reference values $V_i$ measured on the first glow plug, the value $R_2$ of the set of comparative values $V_i$ measured on the second glow plug is compared with the value $R_2$ of the set of reference values $V_i$ measured on the second glow plug, and so on. In such a comparison, a deviation of a comparative value from a reference value by less than a specified tolerance value is considered to be an agreement.

In what follows, this comparison is explained using a concrete example for a four-cylinder engine. Assuming the following sets of reference values $S_i$ are available for this engine:

$S_1$=(403 mΩ, 380 mΩ, 383 mΩ, 394 mΩ)
$S_2$=(430 mΩ, 405 mΩ, 409 mΩ, 419 mΩ)
$S_3$=(423 mΩ, 399 mΩ, 402 mΩ, 412 mΩ)
$S_4$=(413 mΩ, 392 mΩ, 394 mΩ, 405 mΩ)

In these sets of reference data, the first resistance was measured on the glow plug of the first cylinder, the second resistance was measured on the glow plug of the second cylinder, the third resistance was measured on the glow plug of the third cylinder and the fourth resistance was measured on the glow plug of the fourth cylinder. The threshold value C used to determine this set of reference values was 400 mΩ. As conditioned by the clock rate of a microprocessor with which the measured values were recorded, it was in general not possible to measure a set of values immediately when the threshold value C was reached; a measurement could only be carried out on each glow plug with a slight time delay after the threshold value had been exceeded. The value $R_i$ of the set of comparative values $V_i$ and of the set of reference values $S_i$ therefore lies slightly above the threshold value ($R_1$ in set $V_1$ or $S_1$, $R_2$ in set $V_2$ or $S_2$, $R_3$ in set $V_3$ or $S_3$, and $R_4$ in set $V_4$ or $S_4$).

The following sets of comparative data are also available for this engine:
$V_1$=(400 mΩ, 378 mΩ, 380 mΩ, 392 mΩ)
$V_2$=(430 mΩ, 406 mΩ, 410 mΩ, 420 mΩ)
$V_3$=(424 mΩ, 399 mΩ, 403 mΩ, 413 mΩ)
$V_4$=(410 mΩ, 390 mΩ, 392 mΩ, 401 mΩ)

The sets of comparative values are respectively compared with the sets of reference values belonging to them, by comparing these value-by-value, i.e., values are respectively compared with one another, which have been measured for glow plugs of the same cylinder. The comparison of $S_1$ with $V_1$ is calculated as $S_1$-$V_1$. A comparison of each set of comparative values $V_i$ with the corresponding set of reference values $S_i$ yields the following result:

$S_1$-$V_1$=(403 mΩ-400 mΩ), (380 mΩ-378 mΩ), (383 mΩ-380 mΩ), (394 mΩ-392 mΩ)
$S_2$-$V_2$=(430 mΩ-430 mΩ), (405 mΩ-406 mΩ), (409 mΩ-410 mΩ), (419 mΩ-420 mΩ)
$S_3$-$V_3$=(423 mΩ-424 mΩ), (399 mΩ-399 mΩ), (402 mΩ-403 mΩ), (412 mΩ-413 mΩ)
$S_4$-$V_4$=(413 mΩ-410 mΩ), (392 mΩ-390 mΩ), (394 mΩ-392 mΩ), (405 mΩ-401 mΩ)

From calculations of the terms in brackets there ensues:
$S_1$-$V_1$=3 mΩ, -2 mΩ, 3 mΩ, 2 mΩ
$S_2$-$V_2$=0 mΩ, -1 mΩ, -1 mΩ, -1 mΩ
$S_3$-$V_3$=-1 mΩ, 0 mΩ, -1 mΩ, -3 mΩ
$S_4$-$V_4$=3 mΩ, 2 mΩ, -2 mΩ, 4 mΩ

If a deviation of a comparative value from a reference value by less than a specified tolerance value of 2 mΩ is still considered to be an agreement, the result is as follows, where 1 is an agreement and 0 is a deviation:
For $S_1$-$V_1$ the result is (0, 1, 0, 1)
For $S_2$-$V_2$ the result is (1, 1, 1, 1)
For $S_3$-$V_3$ the result is (1, 1, 1, 0)
For $S_4$-$V_4$ the result is (0, 1, 1, 0)

This evaluation can be improved if one takes into account that the value $R_i$ of the set of comparative values $V_i$ and of the set of reference values $S_i$ lies slightly above the threshold value, and makes a corresponding linear correction.

In the set of reference values $S_1$, the reference value $R_1$ is 403 mΩ, that is to say, it is 3 mΩ too high. The result can therefore be improved by reducing all reference values of the set of reference values $S_1$ by 3 mΩ, In the set of reference values $S_2$, the reference value $R_2$ is 405 mΩ, that is to say, it is 5 mΩ too high. The result can therefore be improved by reducing all reference values of the set of reference values $S_2$ by 5 mΩ, In the set of reference values $S_3$, the reference value $R_3$ is 402 mΩ, that is to say, it is 2 mΩ too high. The result can therefore be improved by reducing all reference values of the set of reference values $S_3$ by 2 mΩ In the set of reference values $S_4$, the reference value $R_4$ is 405 mΩ, that is to say, it is 5 mΩ too high. The result can therefore be improved by reducing all reference values of the set of reference values $S_4$ by 5 mΩ.

The sets of comparative values must then also be corrected accordingly. In the set of comparative values $V_1$, the comparative value $R_1$ is 400 mΩ, that is to say, it is exactly correct, so that any correction of this set is unnecessary. In the set of comparative values $V_2$, the comparative value $R_2$ is 406 mΩ, that is to say, it is 6 mΩ too high. The result can therefore be improved by reducing all comparative values of the set of comparative values $V_2$ by 6 mΩ, In the set of comparative values $V_3$, the comparative value $R_3$ is 403 mΩ, that is to say, it is 3 mΩ too high. The result can therefore be improved by reducing all comparative values of the set of comparative values $V_3$ by 3 mΩ. In the set of comparative values V4, the comparative value $R_4$ is 401 mΩ, that is to say, it is 1 mΩ too high. The result can therefore be improved by reducing all comparative values of the set of comparative values $V_4$ by 1 mΩ.

Taking these corrections into account, the comparison therefore ensues as:

$(S_1$-3 mΩ$)$-$(V_1$-0 mΩ$)$=(403 mΩ-3 mΩ-400 mΩ), (380 mΩ-3 mΩ-378 mΩ), (383 mΩ-3 mΩ-380 mΩ), (394 mΩ-3 mΩ-392 mΩ)=0 mΩ, −1 mΩ, 0 mΩ, −1 mΩ

$(S_2$-5 mΩ$)$-$(V_2$-6 mΩ$)$=(430 mΩ-5 mΩ-430 mΩ+6 mΩ), (405 mΩ-5 mΩ-406 mΩ+6 mΩ), (409 mΩ-5 mΩ-410 mΩ+6 mΩ), (419 mΩ-5 mΩ-420 mΩ+6 mΩ)=1 mΩ, 0 mΩ, 0 mΩ, 0 mΩ

$(S_3$-2 mΩ$)$-$(V_3$-3 mΩ$)$=(423 mΩ-2 mΩ-424 mΩ+3 mΩ), (399 mΩ-2 mΩ-399 mΩ+3 mΩ), (402 mΩ-2 mΩ-403 mΩ+3 mΩ), (412 mΩ-2 mΩ-413 mΩ+3 mΩ)=0 mΩ, 1 mΩ, 0 mΩ, 0 mΩ

$(S_4$-5 mΩ$)$-$(V_4$-1 mΩ$)$=(413 mΩ-5 mΩ-410 mΩ+1 mΩ), (392 mΩ-5 mΩ-390 mΩ+1 mΩ), (394 mΩ-5 mΩ-392 mΩ+1 mΩ), (405 mΩ-5 mΩ-401 mΩ+1 mΩ)=1 mΩ, 2 mΩ, 2 mΩ, 0 mΩ

If a deviation of a comparative value from a reference value by less than a specified tolerance value of 2 mΩ is still considered to be an agreement, the following result is obtained, where 1 indicates an agreement, and 0 a deviation:

For $S_1$-$V_1$ the result is (1, 1, 1, 1)
For $S_2$-$V_2$ the result is (1, 1, 1, 1)
For $S_3$-$V_3$ the result is (1, 1, 1, 1)
For $S_4$-$V_4$ the result is (1, 1, 1, 1)

It can therefore be detected that no glow plug replacement has taken place and thus all resistance-temperature characteristics are still valid.

If, in the above example, (only) the second glow plug has been replaced, the following sets of comparative values are obtained, for example:

$V_1$=(400 mΩ, 410 mΩ, 380 mΩ, 392 mΩ)
$V_2$=(464 mΩ, 403 mΩ, 441 mΩ, 449 mΩ)
$V_3$=(424 mΩ, 431 mΩ, 403 mΩ, 413 mΩ)
$V_4$=(410 mΩ, 433 mΩ, 392 mΩ, 401 mΩ)

Comparison with the sets of reference data for the previous example of embodiment shows that:

$S_1$-$V_1$=(403 mΩ-400 mΩ), (380 mΩ-410 mΩ), (383 mΩ-380 mΩ), (394 mΩ-392 mΩ)

$S_2$-$V_2$=(430 mΩ-464 mΩ), (405 mΩ-403 mΩ), (409 mΩ-441 mΩ), (419 mΩ-449 mΩ)

$S_3$-$V_3$=(423 mΩ-424 mΩ), (399 mΩ-431 mΩ), (402 mΩ-403 mΩ), (412 mΩ-413 mΩ)

$S_4$-$V_4$=(413 mΩ-410 mΩ), (392 mΩ-433 mΩ), (394 mΩ-392 mΩ), (405 mΩ-401 mΩ)

From calculations of the terms in brackets there ensues:
$S_1$-$V_1$=3 mΩ, −20 mΩ, 3 mΩ, 2 mΩ
$S_2$-$V_2$=−34 mΩ, 2 mΩ, −32 mΩ, −30 mΩ
$S_3$-$V_3$=−1 mΩ, −32 mΩ, −1 mΩ, −3 mΩ
$S_4$-$V_4$=3 mΩ, −41 mΩ, −2 mΩ, 4 mΩ

If a deviation of a comparative value from a reference value by less than a specified tolerance value of 2 mΩ is still considered to be an agreement, the following result is obtained, where 1 indicates an agreement, and 0 a deviation:

For $S_1$-$V_1$ the result is (0, 0, 0, 1)
For $S_2$-$V_2$ the result is (0, 1, 0, 0)
For $S_3$-$V_3$ the result is (1, 0, 1, 0)
For $S_4$-$V_4$ the result is (0, 0, 1, 0)

If one takes into account that the value $R_i$ of the set of reference values $V_i$ and the set of reference values $S_i$ is slightly above the threshold value, and makes the corrections described above, the result of the comparison is as follows:

$(S_1$-3 mΩ$)$-$(V_1$-0 mΩ$)$=(403 mΩ-3 mΩ-400 mΩ), (380 mΩ-3 mΩ-410 mΩ), (383 mΩ-3 mΩ-380 mΩ), (394 mΩ-3 mΩ-392 mΩ)=0 mΩ,−27 mΩ, 0 mΩ,−1 mΩ

$(S_2$-5 mΩ$)$-$(V_2$-3 mΩ$)$=(430 mΩ-5 mΩ-464 mΩ+3 mΩ), (405 mΩ-5 mΩ-403 mΩ+3 mΩ), (409 mΩ-5 mΩ-441 mΩ+3 mΩ), (419 mΩ-5 mΩ-449 mΩ+3 mΩ)=−36 mΩ, 0 mΩ,−34 mΩ,−32 mΩ

$(S_3$-2 mΩ$)$-$(V_3$-3 mΩ$)$=(423 mΩ-2 mΩ-424 mΩ+3 mΩ), (399 mΩ-2 mΩ-431 mΩ+3 mΩ), (402 mΩ-2 mΩ-403 mΩ+3 mΩ), (412 mΩ-2 mΩ-413 mΩ+3 mΩ)=0 mΩ, −31 mΩ, 0 mΩ, 0 mΩ

$(S_4$-5 mΩ$)$-$(V_4$-6 mΩ$)$=(413 mΩ-5 mΩ-410 mΩ+1 mΩ), (392 mΩ-5 mΩ-433 mΩ+1 mΩ), (394 mΩ-5 mΩ-392 mΩ+1 mΩ), (405 mΩ-5 mΩ-401 mΩ+1 mΩ)=−1 mΩ, −45 mΩ, 2 mΩ, 0 mΩ

If a deviation of a comparative value from a reference value by less than a specified tolerance value of 2 mΩ is still considered to be an agreement, the following result is obtained, where 1 indicates an agreement, and 0 a deviation:

For $S_1$-$V_1$ the result is (1, 0, 1, 1)
For $S_2$-$V_2$ the result is (0, 1, 0, 0)
For $S_3$-$V_3$ the result is (0, 0, 1, 0)
For $S_4$-$V_4$ the result is (0, 0, 0, 1)

For the first set, the first comparative value is always anticipated to be in agreement with the first reference value, as the values in question were measured when the threshold value C was reached. Similarly, for the second set, an agreement between the first comparative value and the second reference value is always to be anticipated. Generally speaking, for the $i^{th}$ set an agreement between the $i^{th}$ comparative value and the $i^{th}$ reference value is always to be anticipated, as the values in question were measured when the threshold value C was reached. Here i is an integer for which all numbers from 1 up to the number of glow plugs of the engine are to be used one after another.

The above comparison thus shows agreement in a comparison between the second set of comparative values and the second set of reference values only with regard to the second glow plug, and no agreement for all the other glow plugs. The comparison of the other sets of comparative values with the sets of reference values associated with them, on the other hand, shows no agreement only for the second glow plug, and agreement for all the other glow plugs. This comparison result thus proves that only the second glow plug was replaced, and the other glow plugs of the engine are unchanged.

If the result of a comparison does not give a clear result, a statistical evaluation can be undertaken. In order to increase the amount of data available for this purpose, the determination of reference and comparative values can be performed with a plurality of threshold values, for example with a first threshold value of 400 mΩ and a second threshold value of 500 mΩ, The evaluation then takes place in the manner described, with the sets of reference and comparative values of the first threshold value firstly being processed separately, and the sets of reference and comparative values of the second threshold value firstly being processed separately. The results of the comparisons are then amalgamated and statistically evaluated together.

Once it has been established through application of the inventive method that some or all the glow plugs of the engine have been replaced, specific control parameters must be determined for the glow plugs that have been replaced, such as a resistance-temperature characteristic. For example, the resistance-temperature characteristic of a glow plug can be determined by heating it under controlled conditions for a longer period of time, for example 2 minutes at a constant power rating, e.g., 33 W, with the engine switched off. The temperature reached in thermodynamic equilibrium under these circumstances then depends essentially only on the heat capacity of the glow plug and the cooling due to heat dissipation via the engine, so that the final temperature then reached is known. The advantage is that this time-consuming re-characterization does not have to be carried out for all the glow plugs of the engine, but only for those glow plugs which, due to replacement, aging or defect, have such a severely altered resistance-temperature characteristic that a resistance-temperature characteristic stored for the engine cylinder in question has become unusable.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method for detecting a glow plug replacement or an aging of a glow plug, comprising:
   (a) supplying a uniformly specified electrical power to each of the glow plugs of an engine for a predetermined amount of time to heat all glow plugs;
   (b) monitoring each glow plug to assess whether a temperature-dependent variable of each said glow plug reaches a threshold value;
   (c) when the threshold value has been reached for a first glow plug, a first value of the temperature-dependent variable is measured substantially simultaneously for all the other glow plugs of the engine, and the first measured values are stored as a first set of reference values associated with the first glow plug;
   (d) when the threshold value has been reached for a second glow plug, a second value of the temperature-dependent variable is measured simultaneously for all the other glow plugs of the engine, and the second measured values are stored as a second set of reference values associated with the second glow plug;
   (e) continuing the monitoring until the temperature-dependent variable has reached the threshold value for all of the glow plug, and a set of reference values associated with each glow plug has been determined and stored for each glow plug, or the specified period of time has elapsed;
   (f) after the set of reference values has been determined in step (e) for each glow plug, determining a set of comparative values for each glow plug during a subsequent heating process repeating steps (a)-(e) and storing the values thus determined as a set of comparative values;
   (g) for each glow plug, comparing the set of comparative values with the set of reference values, wherein each comparative value is compared with the corresponding reference value;
   (h) considering a deviation of a comparative value from a reference value by less than a specified tolerance value as an agreement; and
   (i) using step (h) to conclude which of the glow plugs of the engine are unaltered and which have a resistance-temperature characteristic that has been altered to an extent indicating replacement, aging or a defect.

2. The method according to claim 1, wherein a conclusion is drawn that all the glow plugs have been replaced when, for the first glow plug, no agreement was established in the comparison between the set of comparative values and the set of reference values for all the other glow plugs, and, for the second glow plug no agreement was established in the comparison between the set of comparative values and the set of reference values for all the other glow plugs.

3. The method according to claim 1, wherein a conclusion is drawn that the first glow plug has been replaced, has aged or is defective when, for the first glow plug, no agreement has been established in the comparison between the set of comparative values and the set of reference values for all the other glow plugs and for the second glow plug, agreement has been established in the comparison between the set of comparative values and the set of reference values for all the other glow plugs apart from the first glow plug.

4. The method according to claim 1, wherein the sets of reference data and the sets of comparative data are each corrected linearly by an amount by which the measured value at the $i^{th}$ glow plug deviates from the threshold value in the $i^{th}$ set of reference values, or the $i^{th}$ set of comparative values, wherein i is a whole number whose value is between 1 up to the number of glow plugs of the engine.

5. The method according to claim 1, wherein during heating, the electrical variable is measured simultaneously on all glow plugs, at time intervals that become shorter as heating progresses.

6. The method according to claim 1, wherein during heating the electrical variable is measured simultaneously on all glow plugs at constant time intervals.

7. The method according to claim 1, wherein a glow plug is also detected as defective when the temperature-dependent electrical variable measured on said glow plug does not reach the threshold value within the specified period of time.

8. The method according to claim 1, wherein a glow plug replacement is detected by the fact that no agreement is found in a majority of comparisons.

9. The method according to claim 1, wherein additional sets of reference values and associated sets of comparative values are also determined with a second threshold value, and the agreements determined during comparisons are statistically evaluated.

* * * * *